United States Patent
Imbimbo et al.

(10) Patent No.: US 11,363,136 B2
(45) Date of Patent: Jun. 14, 2022

(54) LAWFUL INTERCEPTION MANIFESTO

(71) Applicant: TELEFONAKTIEBOLAGET LM ERICSSON (PUBL), Stockholm (SE)

(72) Inventors: Amedeo Imbimbo, Caivano (IT); Francesca Marfia, Pagani (IT); Mario Ascione, Torre del Greco (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/273,882

(22) PCT Filed: Sep. 5, 2018

(86) PCT No.: PCT/SE2018/050889
§ 371 (c)(1),
(2) Date: Mar. 5, 2021

(87) PCT Pub. No.: WO2020/050755
PCT Pub. Date: Mar. 12, 2020

(65) Prior Publication Data
US 2021/0337066 A1 Oct. 28, 2021

(51) Int. Cl.
H04M 3/42 (2006.01)
H04M 3/22 (2006.01)
(52) U.S. Cl.
CPC ................................ H04M 3/2281 (2013.01)
(58) Field of Classification Search
CPC .................................................. H04M 3/2281
(Continued)

(56) References Cited

U.S. PATENT DOCUMENTS 7,276,225 B2 * 10/2007 Brown ............... F02M 51/0671
423/594.17
7,657,011 B1 * 2/2010 Zielinski ................ G06Q 10/06
379/35
(Continued)

FOREIGN PATENT DOCUMENTS

WO 2007042624 A1 4/2007
WO 2016060597 A1 4/2016

OTHER PUBLICATIONS

Examination Report in related/corresponding EP Application No. 18 782 530.2 dated Apr. 11, 2022.
(Continued)

Primary Examiner — William J Deane, Jr.
(74) Attorney, Agent, or Firm — Patent Portfolio Builders PLLC

(57) ABSTRACT

A declarative mechanism is provided in the context of lawful interception (LI). A manifesto with information that specifies LI of a communication service or application is created and declared by a service or application provider who, is subject to LI. The declaration takes place in that the manifesto is provided from a first LI function to other LI functions in a communication system. LI data (e.g., call data record, intercept related information and call content) is subsequently generated during LI according to the manifesto by a point of interception within the service or application. The point of interception delivers the LI data to a mediation and delivery function that then forwards it to a law enforcement agency. The law enforcement agency knows how to read and manage the LI data from the manifesto.

9 Claims, 5 Drawing Sheets

(58) Field of Classification Search
USPC .............. 379/201, 1, 201.02, 201.12, 207.02
See application file for complete search history.

(56) References Cited

U.S. PATENT DOCUMENTS

| | | | | |
|---|---|---|---|---|
| 8,260,258 | B1* | 9/2012 | Li .......................... | H04W 12/80 |
| | | | | 455/410 |
| 8,769,112 | B2* | 7/2014 | Zhou ................. | H04M 15/8027 |
| | | | | 709/227 |
| 8,917,844 | B2* | 12/2014 | Buford ................ | H04M 3/4217 |
| | | | | 379/201.12 |
| 2011/0149808 | A1* | 6/2011 | Yared ...................... | H04L 29/06 |
| | | | | 709/227 |
| 2015/0131653 | A1* | 5/2015 | Zaifman ............... | H04L 63/306 |
| | | | | 370/389 |
| 2015/0189661 | A1* | 7/2015 | Lindner ............ | H04W 52/0277 |
| | | | | 455/456.2 |

OTHER PUBLICATIONS

"5G Lawful Interception Architecture," 3GPP SA3-LI Meeting, Newport Beach, CA, Apr. 10, 2018, 9 pages.
International Search Report / Written Opinion dated Apr. 23, 2019 in related/corresponding PCT Application No. PCT/SE2018/050889.

* cited by examiner

LAWFUL INTERCEPTION MANIFESTO

TECHNICAL FIELD

Embodiments herein relate to methods of managing information for controlling lawful interception (LI) in a communication system, a corresponding computer system as well as computer programs and carriers of such computer programs.

BACKGROUND

Emerging and future digital communication systems and networks are characterized by versatility, capacity and speed that vastly surpass the versatility, capacity and speed of prior art systems and networks. Moreover, communication service providers in the so-called $5^{th}$ generation (5G) network scenario are not restricted to traditional telecommunication operators, but include many other providers taking advantage of the inherent versatility, capacity and speed of the systems and networks.

As a consequence of this evolution, in the 5G network scenario, there will be a great opportunity to develop and dynamically deploy new applications, e.g. from Over-The-Top (OTT) service and application providers and/or in Internet-Of-Things (IoT) scenarios. Such new applications or services will be subject to regulations in terms of lawful interception (LI) and automatic data retention. The compliance to such regulations implies a substantial lead time to specify the data that is going to be subject of interception, the interfaces among the nodes involved in the interception and processing of the interception data as well as the implementation of specific software (SW) in the nodes that are to be involved in the LI. Such lead time could impose a showstopper or at least a substantial delay in launching of, e.g., a new application or service. In addition, the costs to comply with regulatory requirements will erode the business case for the new application or communication service.

From this it can be concluded that there is a need to minimize lead time and costs for fulfillment of regulatory requirements related to LI when introducing new types of applications. The jurisdiction would block the deployment of a new application or service in case of noncompliance. Although this problem will be more widespread and accentuated in the evolving and future 5G systems and networks, the same problem also occurs in older network scenarios such as current 4G networks.

SUMMARY

In view of the above, an object of the present disclosure is to overcome drawbacks related to managing information for controlling LI. This object is achieved in a first aspect by a method performed by a first LI function and a second LI function in a communication system.

The method of the first aspect comprises providing, by the first LI function, to the second LI function, an LI manifesto for a communication service in the communication system. The LI manifesto comprises information that specifies LI of the communication service. The second LI function stores the manifesto and provides the manifesto to at least a third LI function for use during LI of the communication service.

The manifest may, e.g., comprises any of specification of a target for LI, specification of an event that triggers LI, specification of data to intercept during LI and specification of a communication interface between LI nodes.

In various embodiments, the first LI function may be a point of interception (POI) function, the second LI function may be a manifesto register and the third LI function may be any of an administrative function (ADMF), a mediation and delivery function (MF2/DF2) for intercept related information (IRI), a mediation and delivery function (MF3/DF3) for call content (CC), a law enforcement monitoring facility (LEMF), a warrant handling client at a LEMF, and a lawful interception control function (LICF).

In a second aspect there is provided a method performed by an LI function in a communication system (100). The method of the second aspect comprise obtaining, from a manifesto register, an LI manifesto for a communication service in the communication system, the LI manifesto comprising information that specifies LI of the communication service. The LI function then performs LI actions as specified by the information in the LI manifesto.

In various embodiments of the method of the second aspect, the LI function may be any of an ADMF, a MF/DF, a LEMF and a lawful interception control function (LICF) and where the performing of LI actions comprises extracting any respective ADMF, MF/DF, LEMF and LICF related information from the manifesto and utilizing the respective extracted any of ADMF, MF/DF, LEMF and LICF related information while performing the respective any of ADMF, MF/DF, LEMF and LICF actions.

In other words, a declarative mechanism in the context of LI is provided. The manifesto with its information that specifies LI of a communication service or application is created and declared by a service or application provider who, for legal reasons, is subject to LI. The declaration takes place in that the manifesto is provided from the first LI function to other LI functions in the communication system, such as the MF/DF and the LEMF and LICF if present. Data that subsequently is generated during LI, e.g. call data record, intercept related information (IRI) and call content (CC) will be produced according to the manifesto by a point of interception (POI) within the service or application, delivered to a MF/DF that will forward it to the law enforcement agency (LEA) who controls the LEMF, who will know from the received manifesto how to read and manage the LI data.

An advantage of such declarative mechanism in an LI context, implementation of LI solutions in all relevant nodes (e.g. IAP, MF/DF, automatic data retention system, LEA) will be very simple by using generic processing engines and just properly configuring manifesto schemas. That is, such a generic processing engine will be driven by the manifesto to decode, encode and manipulate data. This will avoid the need to write code for additional lawful requirements, in terms of nodes to integrate and data types to process. In turn, this has an advantage, e.g., for an operator of a communication system who will find that deployment of new services and applications may be performed faster than in prior art scenarios. Also, from the point of view of a provider of, e.g., over-the-top (OTT) or IoT services and applications can also implement and deploy such new services and applications without major impacts for regulatory compliances. Also, from the point of view of a LEA, the introduction of new services and applications will be simple in that it will not imply major impacts on the monitoring functions, i.e. the LEMF under the control of the LEA will know from the received manifesto how to read and manage the LI data.

In yet a further aspect there is provided a computer system comprising a plurality of server blades, each server blade comprising a processor and a memory. The memory contains instructions executable by the processor whereby the computer system is operative to perform a method as summarized above in connection with any of the first, and second aspect.

In yet a further aspect there are provided a computer program comprising instructions which, when executed on at least one processor cause a processor to carry out a method according to any of the aspects as summarized above. In yet a further aspect there is provided a carrier comprising such a computer program, wherein the carrier is one of an electronic signal, an optical signal, a radio signal and a computer readable storage medium.

These further aspects and embodiments of these further aspects provide the same effects and advantages as summarized above in connection with the method of the first and second aspect.

DETAILED DESCRIPTION

Examples of a declarative mechanism as summarized above will now be described with reference to FIGS. 1 to 6. The use of the manifesto applies to new types of services and applications, new "implementation" of existing services and applications (e.g. from different vendors) or expansions for already existing services and applications with new LI requirements in terms of intercepted data types.

If a completely new service is going to be introduced and provided by a communication service provider (CSP), the normal processes flow is that a LEA defines which data and procedures shall be subject to LI managing and then the CSP acts to comply with new regulations dictated by the LEA. Basically the normal LI flow is that firstly the LEA defines the requirements (stage 1 and 2) and later the CSP will implement the proper solution (i.e. implements appropriate software) to detect what is stated by the LEA regulation. The present disclosure describes examples that are in relation with the so-called "stage 3", where the detailed coding format is specified.

Figure 1A:
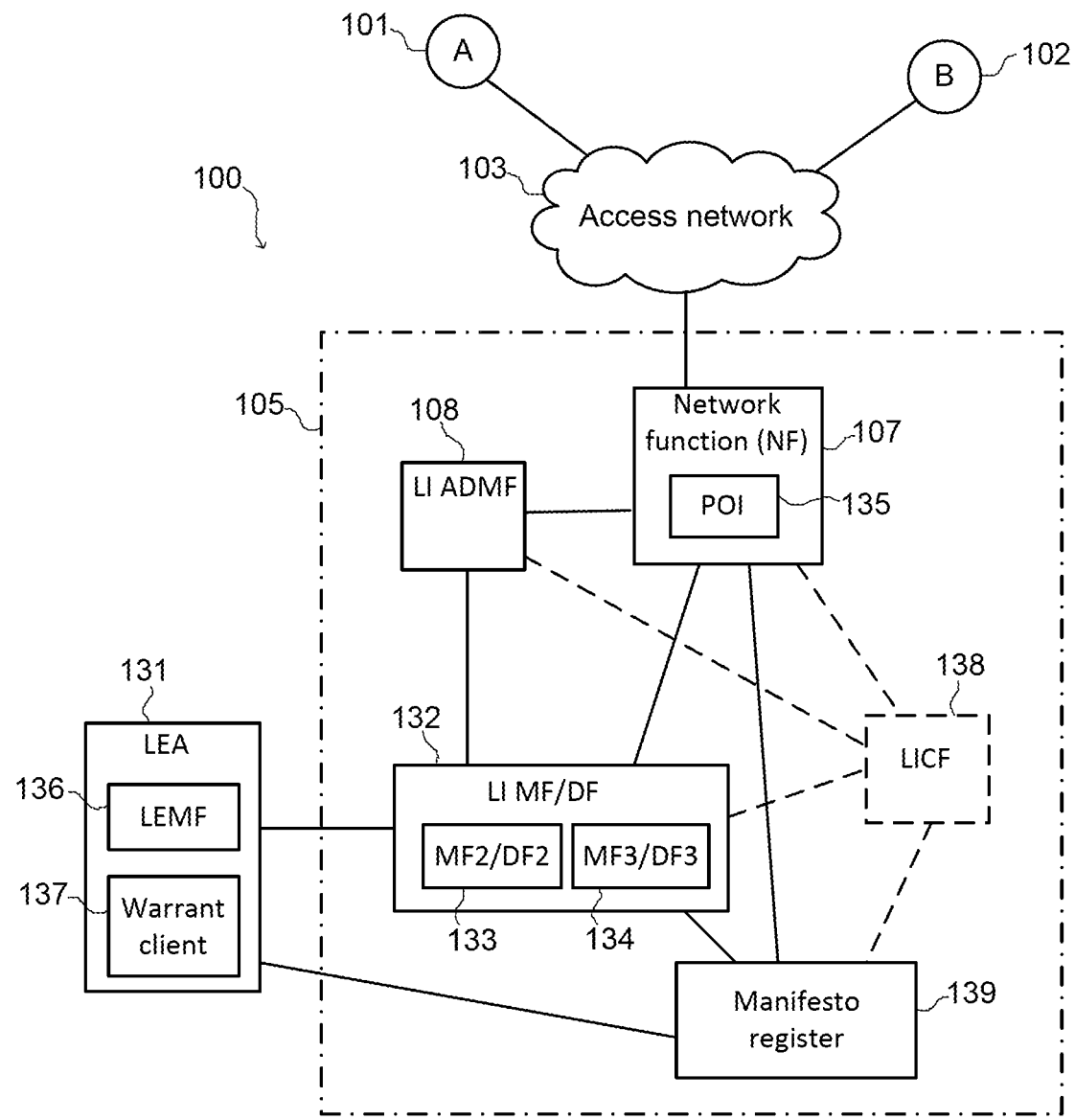
FIGS. 1a and 1b are schematically illustrated block diagrams of LI systems.

FIG. 1a schematically illustrates a first functional representation of a communication system 100 comprising a core network 105 and an access network 103 in which two communicating entities 101, 102 are connected. The access network may, e.g., be in the form of a third generation partnership project (3GPP) radio access network (RAN) or any other type of non-3GPP communication network that may connect to the core network 105.

As the skilled person will realize, communication performed by the entities 101, 102 is enabled by several functional units in both the access network 103 and the core network 105. For the sake of clarity of description, such functional units are not illustrated in full but only schematically represented and exemplified by a network function 107 that, in a 4G context, may be a mobility management entity (MME), a serving gateway (S-GW), a packet data network gateway (P-GW) etc. In a 5G context, the network function may, e.g., be in the form of a policy control function (PCF), a user data management function (UDM) or a session management function (SMF). A common characteristic of such functional units, as represented by network function 107, in the core network 105 is that they may comprise LI functionality in the form of a point of interception (POI) 133.

The core network 105 also comprises an LI ADMF 108 and an LI MF/DF function 132 that connects to a LEA 131. Within the MF/DF 132 a MF2/DF2 133 and a MF3/DF3 134 function are configured to handle IRI and CC received from the POI 135, respectively, and provide the IRI and CC to the LEA 131. The LEA 131 manages a LEMF 136, which receives IRI and CC from the MF2/DF2 133 and MF3/DF3 134, and a warrant client 137. (In the LI management system client-server architecture, a warrant client is software that provides a user interface to administer warrants for LI.) Considering a context in which the communication system 100 is in a 5G context, an LI control function (LICF) 138 may also be present in the core network 105.

In addition to the LI functions described above, the communication system 100 also comprises a functional unit in the form of a manifesto register 139. As will be exemplified in detail below, a manifesto in the manifesto register 139 comprises the LI related information.

Figure 1B:
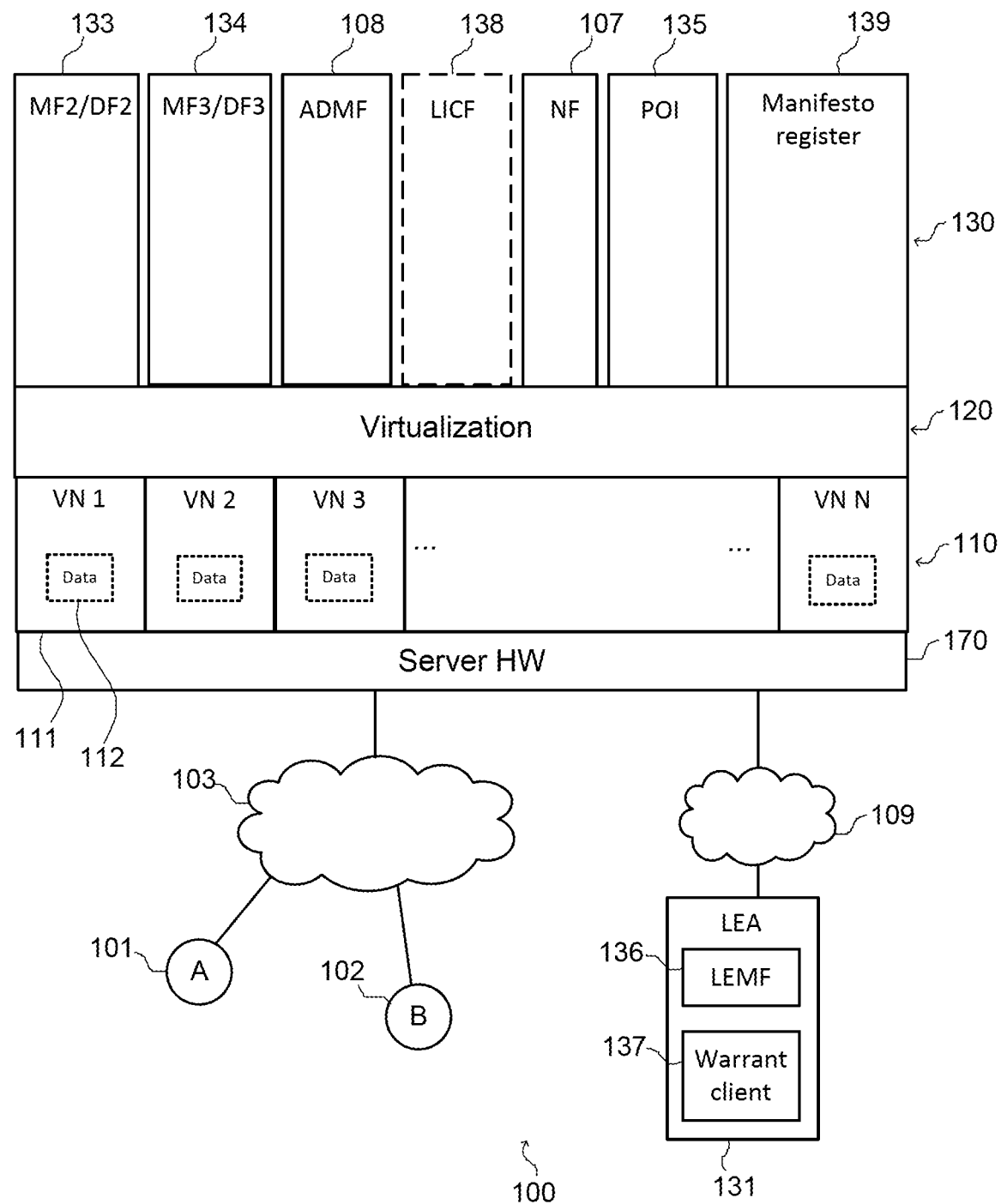

FIG. 1b schematically illustrates a second functional representation of the communication system 100. In this second functional representation, the communication system 100 is realized at least in part by virtualized functions that are executed on virtual nodes 110 that utilize a hardware server platform 170. The MF2/DF2 133, the MF3/DF3 134, the ADMF 108, the LICF 138, the NF 107, the POI 135 and the manifesto register 139 are realized in a functional layer 130 of virtualized network functions (VNF) that execute in the virtual nodes 110 via a virtualization layer 120. The LEA/LEMF 131 with its LEMF 136 and warrant register 137 is connected to the hardware platform 170 via an intermediate network 109, the details of which are outside the scope of the present disclosure.

The ADMF 108, the MF2/DF2 function 133, the MF3/DF3 function 134, the POI 135, the LICF 138 and the manifesto register 139 as well as the LEMF 136 and the warrant client 137 all comprise processing and storage resources that are configured to realize and handle a manifesto as will be exemplified in detail below.

Figure 2:
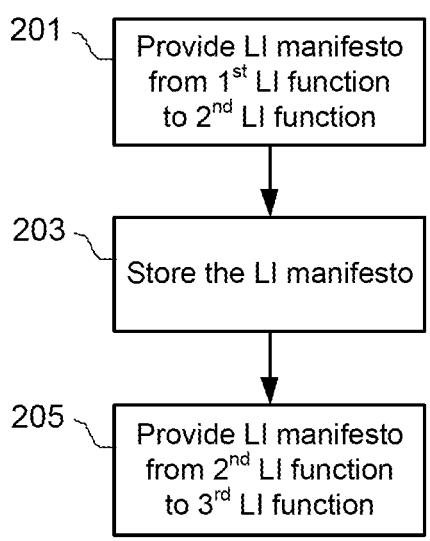
FIGS. 2 and 3 are flowcharts of methods.
Figure 3:
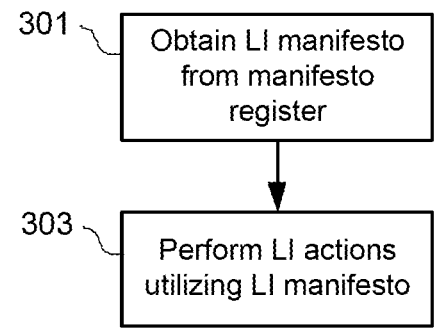
Figure 4:
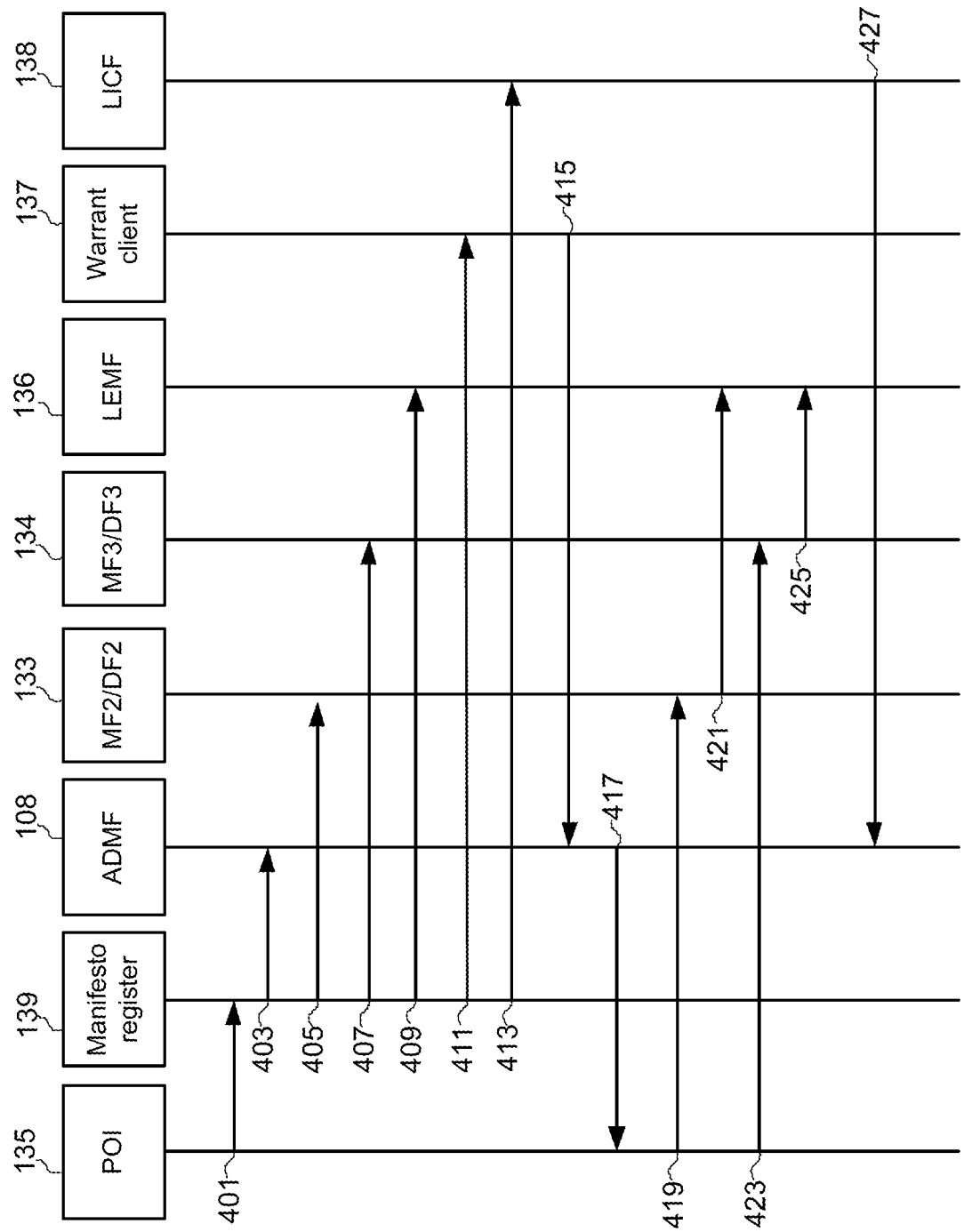
FIG. 4 is a signaling diagram,
FIG. 5 schematically illustrates a computer system, and
FIG. 6 schematically illustrates a computer system.

Turning now to FIGS. 2, 3 and 4, and with continued reference to FIGS. 1a and 1b, embodiments of methods related to an LI manifesto will be described in detail.

A first set of embodiments of a method in the communication system 100 comprises a number of actions performed by a first LI function and a second LI function among the LI functions introduced and described above in connection with FIG. 1a and FIG. 1b:

Action 201

An LI manifesto for a communication service in the communication system 100 is provided by the first LI function 135, to the second LI function 139, the LI manifesto comprising information that specifies LI of the communication service. In FIG. 4, this is exemplified by transmission 401.

In other words, when creating or modify communication services, the POI 135 is in charge of registering the proper manifesto. The service introduction will imply only the configuration of the specific manifesto with the service specific data. For example, a more or less generic software plug in may provide a generic implementation for the manifesto registration in the manifesto register 139, for the administration and audit of targets of interceptions in the ADMF 108 and for the intercepted data delivery to the MF/DF functions 133, 134.

Action 203

The manifesto is then stored by the second LI function 139.

Action 205

The manifesto is provided by the second LI function 139 to at least a third LI function 108, 133, 134, 136, 137, 138 for use during LI of the communication service. In FIG. 4, this is exemplified by transmissions 403, 405, 407, 409, 411 and 413.

The manifesto may comprises any of specification of a target for LI, specification of an event that triggers LI, specification of data to intercept during LI, and specification of a communication interface between LI nodes.

In various embodiments, the first LI function 135 may be a POI function, the second LI function 139 may be a manifesto register and the third LI function 108, 133, 134, 136, 137, 138 may be any of: an ADMF 108, a MF2/DF2 133 for IRI, a MF3/DF3 134 for CC, a LEMF 136, a warrant handling client 137 at a LEMF, and an LICF 138. In FIG. 4, this is exemplified by transmissions 403, 405, 407, 409, 411 and 413, respectively.

Another set of embodiments of a method in the communication system 100 comprises a number of actions performed by an LI function as follows:

Action 301

An LI manifesto for a communication service in the communication system 100 is obtained from a manifesto register 139, the LI manifesto comprising information that specifies LI of the communication service. In FIG. 4, this is exemplified by transmissions 403, 405, 407, 409, 411 and 413.

Action 303

The LI function 108, 133, 134, 136, 138 then performs LI actions as specified by the information in the LI manifesto. For example, a more or less generic software plug in may be integrated in the LI function with all implementation of a generic scheme for handling the information contained in the manifesto.

In some embodiments, the LI function is an ADMF 108. In these embodiments, the performing of LI actions in action 303 comprises extracting ADMF related information from the manifesto and utilizing the extracted ADMF related information while performing ADMF actions. For example, as illustrated in FIG. 4, a target activation signal 415 may be received from the warrant client 137 and the POI 135 is instructed with a signal 417 to activate LI of the target as specified in the target activation signal 415.

In other words, when new communication services are created or modified, the ADMF 108 is notified from the manifesto register 139 about a new or changed manifesto and will get it. The new service introduction will imply only the configuration of the specific manifesto with the service specific data. For example, a more or less generic software plug in will provide a generic implementation for the reception of the manifesto and for the administration and audit of targets of interceptions Target types to use will be read from the manifesto.

In some embodiments, the LI function is an MF/DF 133, 134. In these embodiments, the performing of LI actions in action 303 comprises extracting MF/DF related information from the manifesto and utilizing the extracted MF/DF related information while performing MF/DF actions. For example, as illustrated in FIG. 4, the MF/DF actions may comprise reception 419, 423 of intercepted data, IRI and/or CC, from the POI 135 and provision of the IRI and/or CC to the LEMF 136 as illustrated by transmissions 421, 425.

In other words, when new communication services are created or modified, the MF/DF 133, 134 is notified from the manifesto register 139 about a new or changed manifesto and will get it. The new service introduction will imply only the configuration of the specific manifesto with the service specific data. For example, a more or less generic software plug in will provide a generic implementation for the reception of the manifesto and for reception, mediation and delivery of the intercepted IRI and/or CC. Target types to use will be read from the manifesto. The removal of duplicates can be provided in the MF/DF 133, 134 by using the parameters specified in the manifesto.

In some embodiments, the LI function is an LEMF 136. In these embodiments, the performing of LI actions in action 303 comprises extracting LEMF related information from the manifesto and utilizing the extracted LEMF related information while performing LEMF actions.

In other words, when new communication services are created or modified, the LEMF 136 is notified from the manifesto register 139 about a new or changed manifesto and will get it. For example, a more or less generic software plug in will provide a generic implementation for the reception of the manifesto, for the administration and audit interface of targets of interceptions and for the intercepted data reception and decoding functions. Target types to use will be read from the manifesto. Parameters to be used for the correlation of intercepted data will be read from the manifesto.

In some embodiments involving a 5G architecture, the LI function is an LICF 138. The LICF performs functions relating to maintaining a target list (i.e. a target list that is required not to be stored in the node). In these embodiments, the performing of LI actions in action 303 comprises extracting LICF related information from the manifesto and utilizing the extracted LICF related information while performing LICF actions. In FIG. 4, this is exemplified by transmission 427, which exemplifies transmission of target information from the LICF 138 to the ADMF 108.

In other words, the LICF 138 is notified about new communication service manifesto creation. The main involvement of the LICF 138 relates to association between static targets to be used in the warrant administration—declared in the manifesto—and specific session parameters, as temporary target identifiers—that can also be declared in the manifesto. It shall be noted that in embodiments involving LI in a 3G/4G context, the LICF 138 doesn't exist. In embodiments relating to a 5G context, the LICF 138 is used to get information (e.g. from an LI topology discovery function, not illustrated here) about the target types to be used.

Various embodiments involve a manifesto that comprises type declarations and relations for the intercepted data for the service with which the manifesto is associated. Examples of exposed data types and relations include:

Title of the LI Manifesto
Name of the service
Description of the service
For each session:
  Session identity
  Target type/target identity list
  Other known types and identities
  For each interception service event during the session
    Description of the event
    Event type
    Event time
  Mandatory data: event type, event time, session identity, target list Criteria to perform duplicate detection: event type, event time, session identity Target: target list Criteria to perform correlation of event for the same session: session identity A very simple example of a manifesto is shown below, using JavaScript Object Notation (JSON). However, any other data declarative language can be used to represent the manifesto.

```
{
    "$schema": "http://li-schema.org/li-manifesto-01/schema#",
    "title": "LI Manifesto for My_New_Service",
    "description": "LI Manifesto for My_New_Service LI ",
    "type": "object",
    "interception-record": {
        "event-type": {
            "description": "Type of communication event",
            "type": "integer"
        },
        "service-type": {
            "description": "Type of communication service",
            "type": "integer"
        },
        "event-time": {
            "description": " Communication event Type",
            "time": "string"
        },
        "session-number": {
            "description": " Communication session identifier",
            "session-number": "string"
        },
        "target-list": {
            "type": "array",
            "target": {
                "target-type": "string",
                "target-identity": "string",
            }
            "minItems": 1,
            "uniqueItems": true
        }
        "other-known-identities-list": {
            "type": "array",
            "identity": {
                " identity-type": "string",
                " identity-identity": "string",
            },
            "minItems": 1,
            "uniqueItems": true
        }
    },
    },
    "required": ["event-type", "event-time", " session-number", target-list]
    "duplication-criteria": ["event-type", "event-time", "session-number"]
    "target": ["target"]
    "correlation": ["session-number"]
}
```

As shown by the above manifesto example, all possible data that can be intercepted are declared. In the last rows, it is also reported the list of mandatorily required parameters, the list of parameters that can be used as target, the ones that can be used to remove duplicates and the ones that can be used to correlate data related to the same session.

It is to be understood that a similar type of manifesto can be specified for automatic data retention performed by the LI functions.

Figure 5:
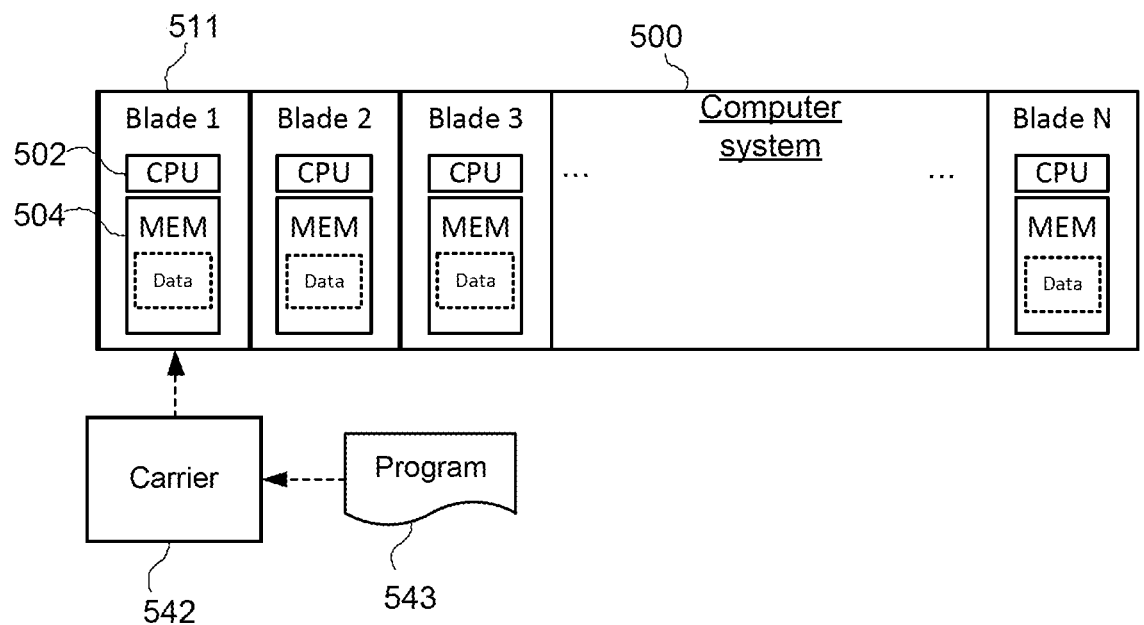

Turning now to. FIG. 5, and with continued reference to FIGS. 1a-b and FIGS. 2-4, a computer system 500 will be described in some detail. The computer system 500, which may correspond to at least part of the communication system 100, comprises a plurality of server blades 511 that comprise a processor 502 and a memory 504. The memory 504 contains instructions executable by the processor 502 whereby the computer system 500 is operative to:

provide, by a first LI function 135, to a second LI function 139, an LI manifesto for a communication service in the communication system 100, the LI manifesto comprising information that specifies LI of the communication service, store, by the second LI function 139, the manifesto, provide, by the second LI function 139, the manifesto to at least a third LI function 108, 133, 134, 136, 137, 138 for use during LI of the communication service.

The instructions that are executable by the processor 502 may be software in the form of a computer program 541. The computer program 541 may be contained in or by a carrier 542, which may provide the computer program 541 to the memory 504 and processor 502. The carrier 542 may be in any suitable form including an electronic signal, an optical signal, a radio signal or a computer readable storage medium.

In some embodiments, the computer system 500 is operative such that the manifesto comprises any of specification of a target for LI, specification of an event that triggers LI, specification of data to intercept during LI, and specification of a communication interface between LI nodes.

In some embodiments, the computer system 500 is operative such that the first LI function 135 is a point of interception, POI, function, the second LI function 139 is a manifesto register, and the third LI function 108, 133, 134, 136, 137, 138 is any of an administrative function, ADMF 108, a mediation and delivery function, MF2/DF2 133 for intercept related information, IRI, a mediation and delivery function, MF3/DF3 134 for call content, CC, a law enforcement monitoring facility, LEMF 136, a warrant handling client 137 at a LEMF, and a lawful interception control function, LICF 138.

In some embodiments, the computer system 500 is operative to:

obtain, from a manifesto register 139, an LI manifesto for a communication service in the communication system 100, the LI manifesto comprising information that specifies LI of the communication service, perform LI actions as specified by the information in the LI manifesto.

In some embodiments, the computer system 500 is operative such that the LI function is an administrative function, ADMF, 108 and operative such that the performing of LI actions comprises extracting ADMF related information from the manifesto and utilizing the extracted ADMF related information while performing ADMF actions.

In some embodiments, the computer system 500 is operative such that the LI function is a mediation and delivery function, MF/DF, 133, 134 and operative such that the performing of LI actions comprises extracting MF/DF related information from the manifesto and utilizing the extracted MF/DF related information while performing MF/DF actions.

In some embodiments, the computer system 500 is operative such that the LI function is a law enforcement monitoring facility, LEMF, 136, and operative such that the performing of LI actions comprises extracting LEMF related information from the manifesto and utilizing the extracted LEMF related information while performing LEMF actions.

In some embodiments, the computer system 500 is operative such that the LI function is a lawful interception control function, LICF, 138 and operative such that the performing of LI actions comprises extracting LICF related information from the manifesto and utilizing the extracted LICF related information while performing LICF actions.

Figure 6:
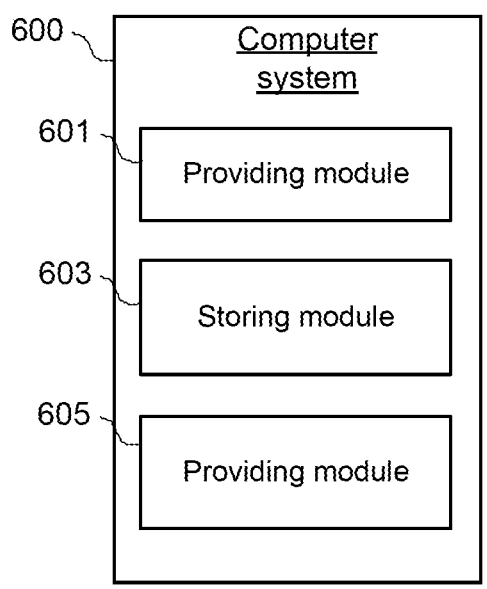

Turning now to FIG. 6, and with continued reference to FIGS. 1a-b and FIGS. 2-5, a computer system 600 will be described in some detail. The computer system 600 comprises:
- a providing module 601, configured to provide, by a first LI function 135, to a second LI function 139, an LI manifesto for a communication service in the communication system 100, the LI manifesto comprising information that specifies LI of the communication service,
- a storing module 603 configured to store, by the second LI function 139, the manifesto,
- a providing module 605, configured to provide, by the second LI function 139, the manifesto to at least a third LI function 108, 133, 134, 136, 137, 138 for use during LI of the communication service.

The computer system 600 may comprise further modules that are configured to perform in a similar manner as, e.g., the computer system 500 described above in connection with FIG. 5.

The invention claimed is:

1. A method performed by a Point-of-Interception, PoI, function and a manifesto register in a communication system, the method comprising:
   providing, by the PoI function, to the manifesto register, an LI manifesto for a communication service in the communication system, the LI manifesto comprising information that specifies LI of the communication service, a target for LI, an event that triggers LI, data to intercept during LI, and a communication interface between LI nodes,
   storing, by the manifesto register, the LI manifesto,
   providing, by the manifesto register, the LI manifesto to at least an LI function for use during LI of the communication service.

2. The method of claim 1, where the LI function is any of:
   an administrative function, ADMF,
   a mediation and delivery function, MF2/DF2, for intercept related information, IRI,
   a mediation and delivery function, MF3/DF3, for call content, CC,
   a law enforcement monitoring facility, LEMF,
   a warrant handling client at a LEMF, and
   a lawful interception control function, LICF.

3. A method performed by a lawful interception, LI, function in a communication system, the method comprising:
   obtaining, from a manifesto register, an LI manifesto for a communication service in the communication system, the LI manifesto comprising information that specifies LI of the communication service, a target for LI, an event that triggers LI, data to intercept during LI, and a communication interface between LI nodes; and
   performing LI actions as specified by the information in the LI manifesto.

4. The method of claim 3, where the LI function is an administrative function, ADMF, and where the performing of the LI actions comprises extracting ADMF related information from the LI manifesto and utilizing the extracted ADMF related information while performing ADMF actions.

5. The method of claim 3, where the LI function is a mediation and delivery function, MF/DF, and where the performing of the LI actions comprises extracting MF/DF related information from the LI manifesto and utilizing the extracted MF/DF related information while performing MF/DF actions.

6. The method of claim 3, where the LI function is a law enforcement monitoring facility, LEMF, and where the performing of the LI actions comprises extracting LEMF related information from the LI manifesto and utilizing the extracted LEMF related information while performing LEMF actions.

7. The method of claim 3, where the LI function is a lawful interception control function, LICF, and where the performing of the LI actions comprises extracting LICF related information from the LI manifesto and utilizing the extracted LICF related information while performing LICF actions.

8. A computer system comprising a plurality of server blades, each server blade comprising a processor and a memory, said memory containing instructions executable by said processor whereby said processor and memory serve as a Point-of-Interception, PoI, function and a manifesto register that perform a method comprising:
   providing, by the PoI function, to the manifesto register, an LI manifesto for a communication service in the communication system, the LI manifesto comprising information that specifies LI of the communication service, a target for LI, an event that triggers LI, data to intercept during LI, and a communication interface between LI nodes,
   storing, by the manifesto register, the LI manifesto,
   providing, by the manifesto register, the LI manifesto to at least an LI function for use during LI of the communication service.

9. A computer readable storage medium storing a computer program, which when executed on at least one processor and a memory in a server blade of a computer system, causes the at least one processor and the memory to operate as a Point-of-Interception, PoI, function and a manifesto register performing a method comprising:
   providing, by the PoI function, to the manifesto register, an LI manifesto for a communication service in the communication system, the LI manifesto comprising information that specifies LI of the communication service, a target for LI, an event that triggers LI, data to intercept during LI, and a communication interface between LI nodes,
   storing, by the manifesto register, the LI manifesto,
   providing, by the manifesto register, the LI manifesto to at least an LI function for use during LI of the communication service.

* * * * *